April 30, 1974　　J. BUISSIERE　　3,808,103
BACTERIA RECEPTACLES
Filed Aug. 10, 1971

INVENTOR
JEAN BUISSIERE
BY Sughrue, Rothwell, Mion, Zinn & Macpeak
ATTORNEYS

United States Patent Office 3,808,103
Patented Apr. 30, 1974

3,808,103
BACTERIA RECEPTACLES
Jean Buissiere, Villeurbanne, France, assignor to Compagnie Generale d'Automatisme, Paris, France
Filed Aug. 10, 1971, Ser. No. 170,504
Claims priority, application France, Aug. 11, 1970, 7029539
Int. Cl. C12b 1/00
U.S. Cl. 195—139
3 Claims

ABSTRACT OF THE DISCLOSURE

Bacteria receptacles for simultaneous investigation of aerobic and anaerobic effects on bacteria culture are provided by combining a pair of plates. A first plate forming a series of cells and a second plate carrying apertured platelets with absorbent material. The apertured platelets are designed to float on the culture of bacteria and provide regions of both aerobic and anaerobic conditions. Alternatively a third plate can be used to form an additional series of cells.

BACKGROUND OF THE INVENTION

Field of the invention

The present invention relates to a device for the study of bacteria and more particularly plastic receptacles for bacteria.

Description of the prior art

The present invention is more particularly concerned with a modification of the invention of our co-pending French application No. 57,411/69, hereinafter referred to as the parent patent.

The parent patent describes a receptacle for simultaneous aerobic and anaerobic investigation of a bacteria culture, comprising a first part open to the atmosphere and a second and closed part communicating with the first part via a passage opening into the first part near its base, the second part being so arranged that the second part is completely filled before the first part, the air initially contained in the second part escaping via the first part, whereby a bacteria culture filling the receptacle experiences aerobic conditions at the entry of the first part and anaerobic conditions in the second part, the first and second parts being of a transparent material.

The invention of the parent patent is notable in that, using it, the development of bacteria in aerobic and/or anaerobic conditions can be realized simultaneously in the same receptacle. The receptacle contains a medium of a culture of the bacteria and at least one reagent.

The study of bacteria can be carried out continuously by passing a large number of receptacles past measuring instruments. Each receptacle is identical and one parameter concerning the contents is varied in each receptacle. All the other parameters are identical. The receptacles, as has been described in the parent patent, are preferably formed either on a single plate or on two plates made of a transparent and chemically inert plastics material.

SUMMARY OF THE INVENTION

According to the present invention there is provided a device for the simultaneous aerobic and anaerobic investigation of a bacteria culture comprising a first plate having an array of inset portions forming cells, a second plate for placing over the first plate and carrying a series of absorbent apertured platelets arranged in positions which correspond to the positions of the cells on the first plate, and wherein each receptacle formed when the first and second plates are applied together has at least one aperture communicating with the atmosphere.

BRIEF DESCRIPTION OF THE DRAWINGS

The invention will be further described by way of example with reference to the accompanying drawings, in which.

DESCRIPTION OF THE PREFERRED EMBODIMENT

Figure 1:
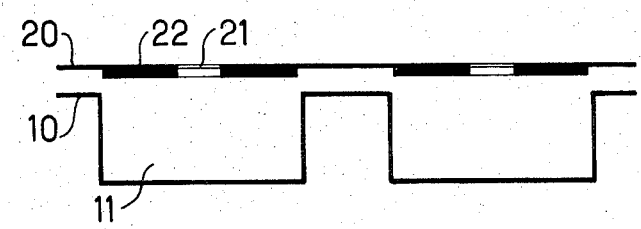
FIGS. 1 to 4 show, in cross-section, devices for the study of the growth and physiology of bacteria.

In FIG. 1, a first plate 10 is provided with cylindrical cells 11 which are arranged in a regular array. A second plate 20 has holes 21, each of which is opposite a cell 11 and has a diameter less than that of the cell. Apertured platelets 22 of an absorbent material are placed on the lower face of the second plate 20. Their inner diameter is substantially equal to that of the holes 21 and their outer diameter is substantially equal to that of the cells. The platelets 22 are impregnated with chemicals (substrate or a coloring agent) and dried for example by lyophilization. Although not necessarily circular, the platelets 22 will for convenience be referred to as rings.

The plates 10 and 20 are preferably made from a transparent and chemically inert plastics material. The rings 22 can be made from blotting paper, fiberglass, cellulose or similar absorbent materials. They are fixed to the plate 20 with a material that does not react with the chemicals in the cells.

The plates 10 and 20 can be separated and kept in closed sterile protection envelopes until they are to be used.

In order to use the device, the plate 20 is placed against the side of the plate 10 containing the openings of the cells 11, with the rings 22 above the cells 11. With the aid of a series of punches, the rings 22 are cut out of the plate 20 and fall into the cells 11. A suspension of bacteria is injected into each of the cell 11. The rings 22 together with the ring of plastics material to which they are attached, float on the surface of the suspension of bacteria. The ring 22 is in contact with the suspension while the ring of plastics material defines an interior region where aerobic conditions are realized and an annular region where anaerobic conditions are realized.

In a variant (not shown) the holes 21 are formed in the bottoms of the cells. In this case, the two plates are welded together where they are in mutual contact, the rings 22 being free in each cell 11.

Figure 2:
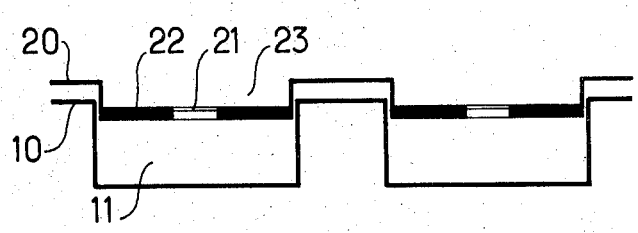

In FIG. 2, the plate 20 has the rings 22 provided underneath the insets which form cells 23 of substantially the same diameter and placed at positions corresponding to the cells 11.

When the device is in use, the plate 20 can be either punched out at the positions corresponding to the cells 23 or arranged such that each cell 23 floats above the layer of culture.

Figure 3:
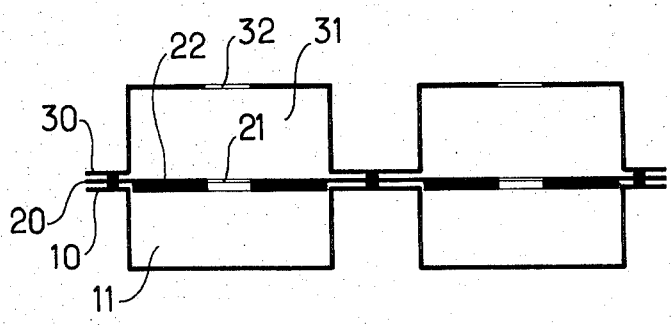

In the variant of FIG. 3, the device has a third plastic plate 30 which has a series of cells 31 substantially of the same dimensions as the cells 11 and whose bottoms have holes 32 of the same diameter as the holes 21. The third plate is placed over the plates 10 and 20 carrying the absorbent rings. The plates 10 and 20 and 30 are held together by heat welding. The cells 31 face the cells 11 and are separated therefrom by the plate 20. The absorbent rings 22 are disposed on the side of the plate 10 adjacent the cells 11. Alternatively, the plate 20 can be punched out along the contours of the rings 22. In this case each cell 11, containing an absorbent ring and a ring of plastics material from the punched out plate 20, has a cell 31 with a pierced bottom placed over it.

In FIGS. 1 to 3, the cells are cylindrical, the rings 22 are circular and the holes round. These elements can take any shape in which case the shape of the other elements must be modified to obtain aerobic and anaerobic regions in each cell. Cells of circular or elongated cross-section can be used. The rings of absorbent material have an exterior contour substantially the same as that of the holes.

Figure 4:
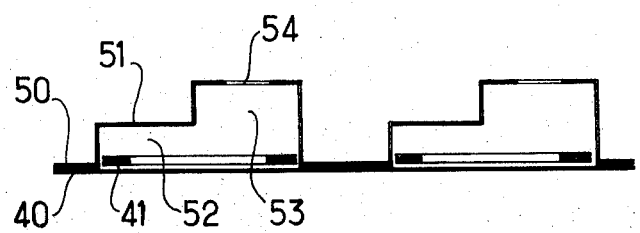

In the variant shown in FIG. 4, the device comprises two plates 40 and 50 made from a transparent and chemically inert plastics material. The plate 40 is plane and has absorbent rings having an elliptical or elongated shape disposed on one face. The plate 50 is provided with deformations such as 51 at different levels. These two plates are welded together according to the contour of the deformations such as 51. They form between them receptacles 52 and 53 which are in the form of communicating cylinders. The rings 41 are placed in the receptacles 52 and 53. Alternatively, they can be fixed to the interior face of the plate 40 so as to allow the diffusion of the substances which they contain into the suspension of bacteria which is injected into the receptacles. The plate 50 also has holes such as 54, each being placed in the part of a deformation corresponding to a cylinder such as 53 with the aperture or hole of ring 41 being relatively eccentric to hole 54. In this way after injection of a suspension of bacteria, an anaerobic region is formed in the cylinder 52 and an anaerobic region in the cylinder 53. The shape of the ring shown in FIG. 4 can be modified as is convenient.

The devices as described have the advantage that the chemicals and coloring agents can be introduced into the receptacles with ease. They can be held in their supports until use.

The plastics ring enables an anaerobic region to be formed above the aerobic region towards the sides of each receptacle. This ring leads to a considerable reduction in evaporation losses and also helps to avoid the effect of the concave meniscus which is formed when the liquids are introduced into the receptacles. In the device of FIG. 3, the plastics ring can be complemented with the plate 30 punched to form the hole 32.

Good photometry readings can be obtained as a light beam has to cross only one layer of plastics. (That is the bottom surface of the receptacles.) The readings can be improved by making the bottom surface optically perfect.

While the above description discloses the preferred embodiments of the present invention, it should be clear that various modifications can be made by one skilled in the art and accordingly, the scope of the present invention should be measured from the following claims, in which I claim:

1. A device for the simultaneous aerobic and anaerobic investigation of a bacteria culture, comprising:
    a first plate having an array of inset portions forming cells,
    a second plate adapted to be placed over the first plate, said second plate also being provided with an array of cells corresponding to that of said first plate, said second plate having a profile corresponding respectively to the cells of the first plate, and each cell of said second plate having its bottom apertured,
    a series of absorbent apertured platelets carried by said second plate and being disposed on the lower face of respective cells of said second plate and positioned within corresponding cells of said first plate, each platelet being of a size and configuration corresponding to the cells of said first plate and having a thickness less than the depth of the first plate cells and arranged in positions which correspond to the position of the cells on said first plate, said second plate and said platelets having aligned apertures therein at each platelet location,
    whereby, when said first and second plates are applied together, they form receptacles having apertures communicating with the atmosphere.

2. A device for the smultaneous aerobic and anaerobic investigation of a bacteria culture, comprising:
    a first plate having an array of inset portions forming cells with each cell being in the form of two laterally communicating cylinders of unequal height,
    apertures being formed within said first plate at each cell location and defined substantially by the lateral walls of one of two cylinders,
    a second plate adapted to be placed over the opening opposite the aperture of the first plate,
    a series of absorbent platelets carried by the second plate of a size and configuration corresponding to the first plate cells and arranged in positions corresponding to the first plate cells, said first and second plates being fixed together in a sealed manner to form receptacles each having an aperture communicating with the atmosphere and each having a platelet therein,
    said platelets being of a thickness less than the depth of said cells as defined by the shortest of the two cylinders forming the same, and said platelets being elongated and being apertured such that the apertures of the platelet is eccentrically disposed relative to its corresponding aperture of said first plate.

3. The device according to claim 2, wherein the platelets are fixed to one face of the second plate.

References Cited
UNITED STATES PATENTS

| | | | |
|---|---|---|---|
| 2,986,497 | 5/1961 | Pagano et al. | 195—103.5 |
| 2,871,168 | 1/1959 | Salisbury | 195—139 |
| 3,107,204 | 10/1963 | Brown et al. | 195—139 |

ALVIN E. TANENHOLTZ, Primary Examiner

U.S. Cl. X.R.
195—103.5, 126